United States Patent
Lepeska et al.

(10) Patent No.: US 10,880,396 B2
(45) Date of Patent: Dec. 29, 2020

(54) PRE-FETCHING RANDOM-VALUE RESOURCE LOCATORS

(71) Applicant: VIASAT, INC., Carlsbad, CA (US)

(72) Inventors: Peter J Lepeska, Boston, MA (US); Demetrios J Tsillas, Littleton, MA (US)

(73) Assignee: VIASAT, INC., Carlsbad, CA (US)

( * ) Notice: Subject to any disclaimer, the term of this patent is extended or adjusted under 35 U.S.C. 154(b) by 370 days.

(21) Appl. No.: 15/819,679

(22) Filed: Nov. 21, 2017

(65) Prior Publication Data

US 2018/0159948 A1 Jun. 7, 2018

Related U.S. Application Data

(60) Provisional application No. 62/429,578, filed on Dec. 2, 2016.

(51) Int. Cl.
| | |
|---|---|
| *G06F 15/16* | (2006.01) |
| *H04L 29/08* | (2006.01) |
| *H04L 29/06* | (2006.01) |
| *H04B 7/185* | (2006.01) |

(52) U.S. Cl.
CPC .......... *H04L 67/2847* (2013.01); *H04L 67/02* (2013.01); *H04L 67/146* (2013.01); *H04L 67/42* (2013.01); *H04B 7/185* (2013.01); *H04L 67/32* (2013.01)

(58) Field of Classification Search
CPC ............. H04L 67/2847; H04L 27/0881; G06F 2216/13
USPC ....................................................... 709/203
See application file for complete search history.

(56) References Cited

U.S. PATENT DOCUMENTS

| | | |
|---|---|---|
| 6,085,193 A | 7/2000 | Malkin et al. |
| 8,335,838 B2 | 12/2012 | Zhang et al. |
| 8,341,245 B1 | 12/2012 | Roskind et al. |
| 8,478,843 B1 | 7/2013 | Ortlieb et al. |
| 9,037,638 B1 * | 5/2015 | Lepeska ............... H04L 67/2847 709/203 |
| 9,083,583 B1 | 7/2015 | Roskind et al. |

(Continued)

*Primary Examiner* — Wing F Chan
*Assistant Examiner* — Andrew Woo
(74) *Attorney, Agent, or Firm* — Chang & Hale LLP

(57) ABSTRACT

Once resolved, a random-value universal resource locator (RV-URL) identifies a resource on a host server and constitutes an instruction to a local device executing a network transaction to fetch the resource. Embodiments of the invention resolve and pre-fetch an RV-URL from a remote host server and then pre-position, on a client-side of a communications link to the remote server, both resolution information indicating how the RV-URL was resolved and the pre-fetched resource. Later, when the client device is executing a network transaction and encounters an RV-URL, the client device determines whether resolution information for the RV-URL is locally stored. If so, the client device uses the resolution information to resolve the RV-URL to the same value that was used during pre-fetch. The client device then sends a request for the resolved RV-URL. The request is intercepted on the client-side of the communications link, where it is determined whether a locally cached pre-fetched resource corresponds to the intercepted request. If so, the locally cached pre-fetched resource is provided to the local device as a complete response to the request, which can then be discarded.

28 Claims, 15 Drawing Sheets

(56) References Cited

U.S. PATENT DOCUMENTS

| | | |
|---|---|---|
| 9,135,364 B1 | 9/2015 | Sundaram et al. |
| 2002/0010761 A1 | 1/2002 | Carneal et al. |
| 2008/0114773 A1 | 5/2008 | Choi et al. |
| 2013/0297561 A1* | 11/2013 | Mizrotsky ............... H04L 67/42 707/609 |
| 2015/0156194 A1 | 6/2015 | Modi et al. |

* cited by examiner

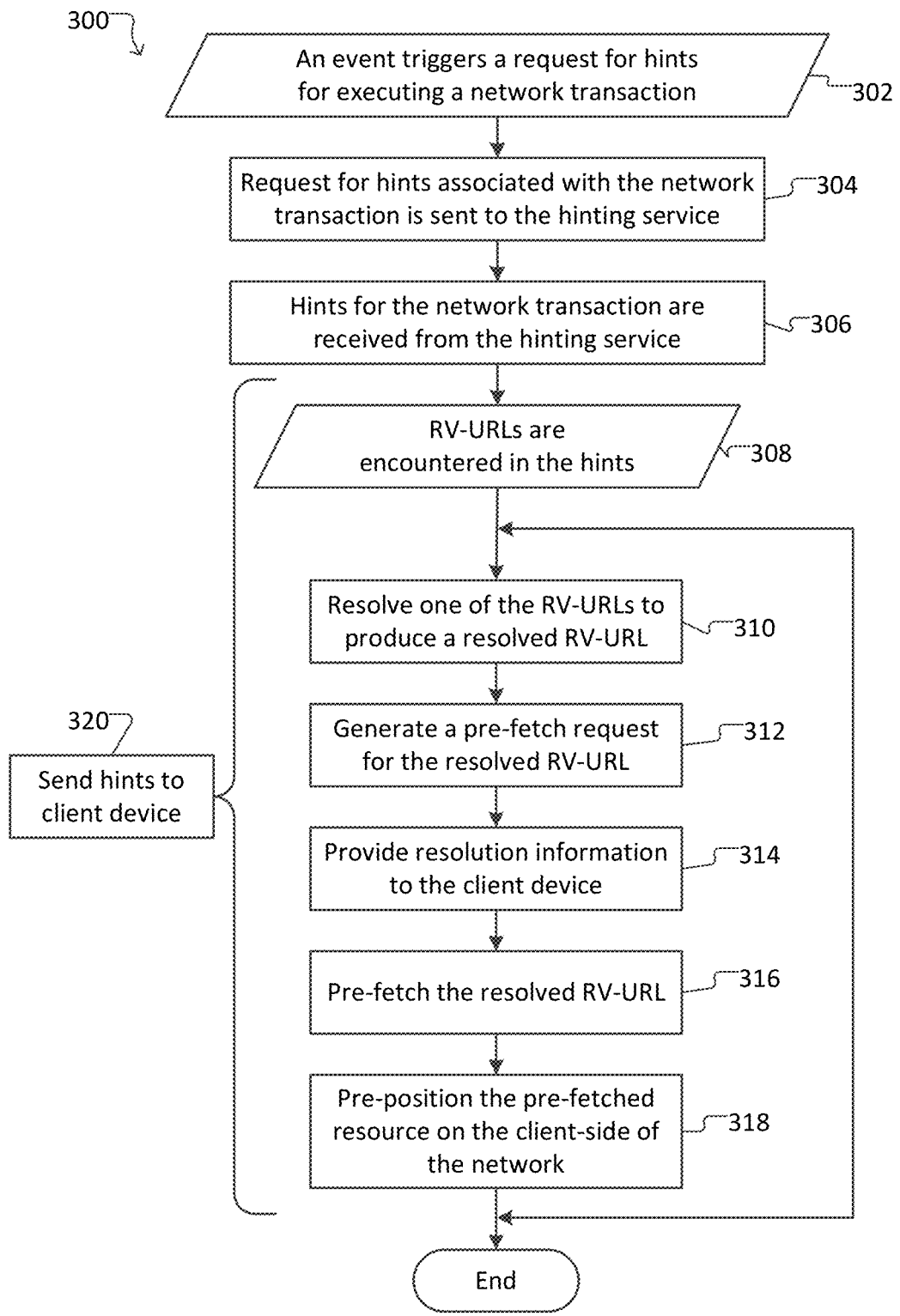

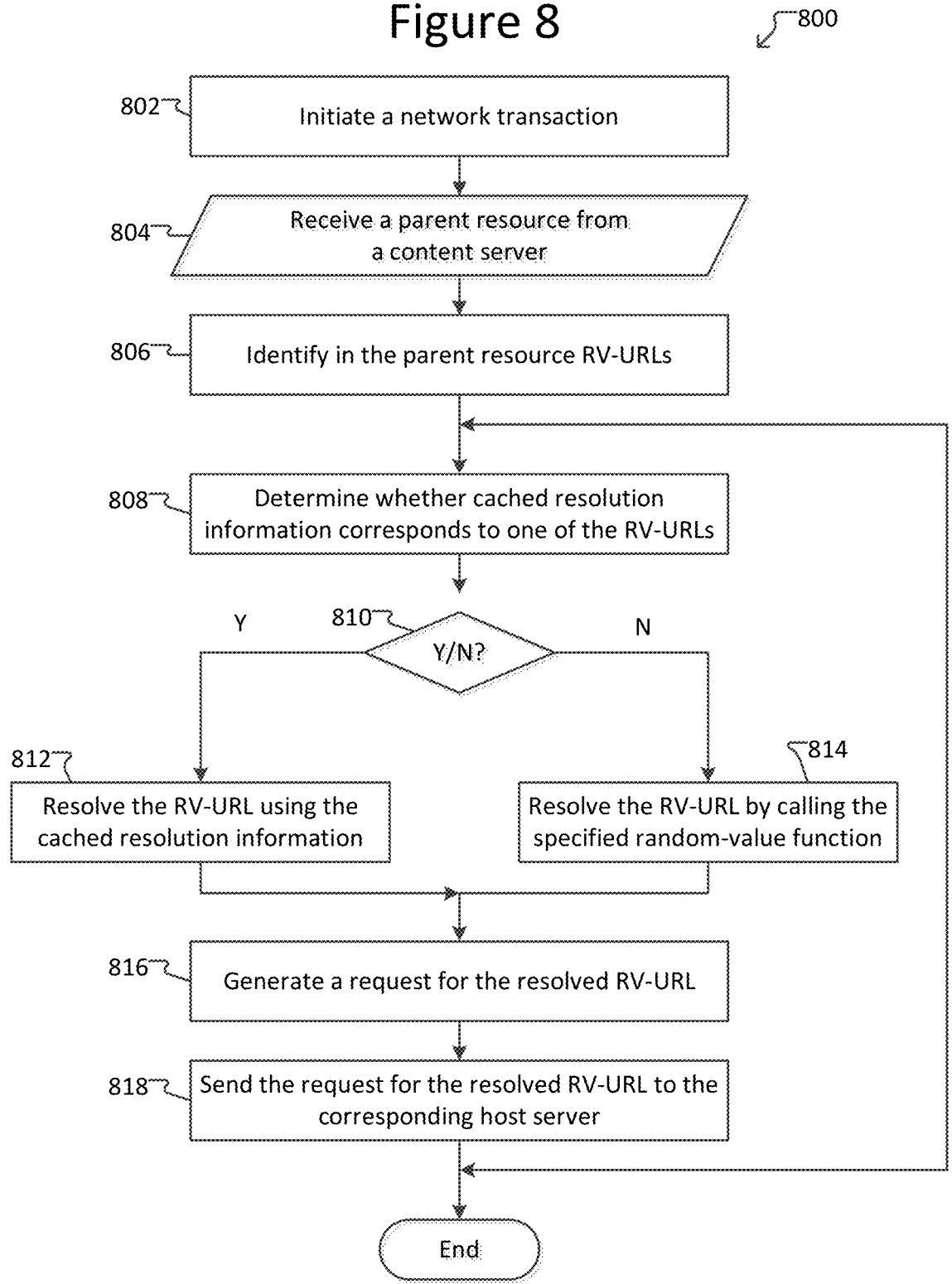

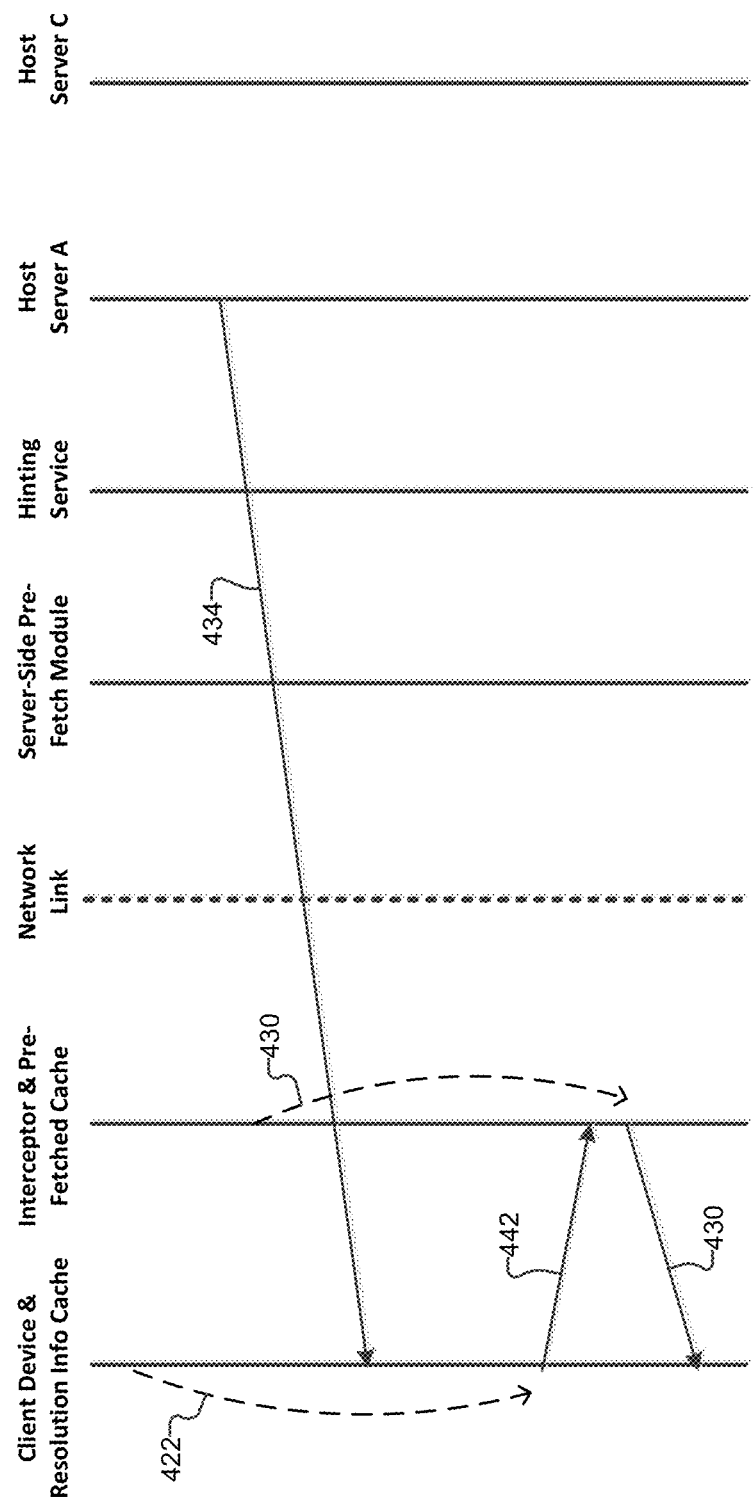

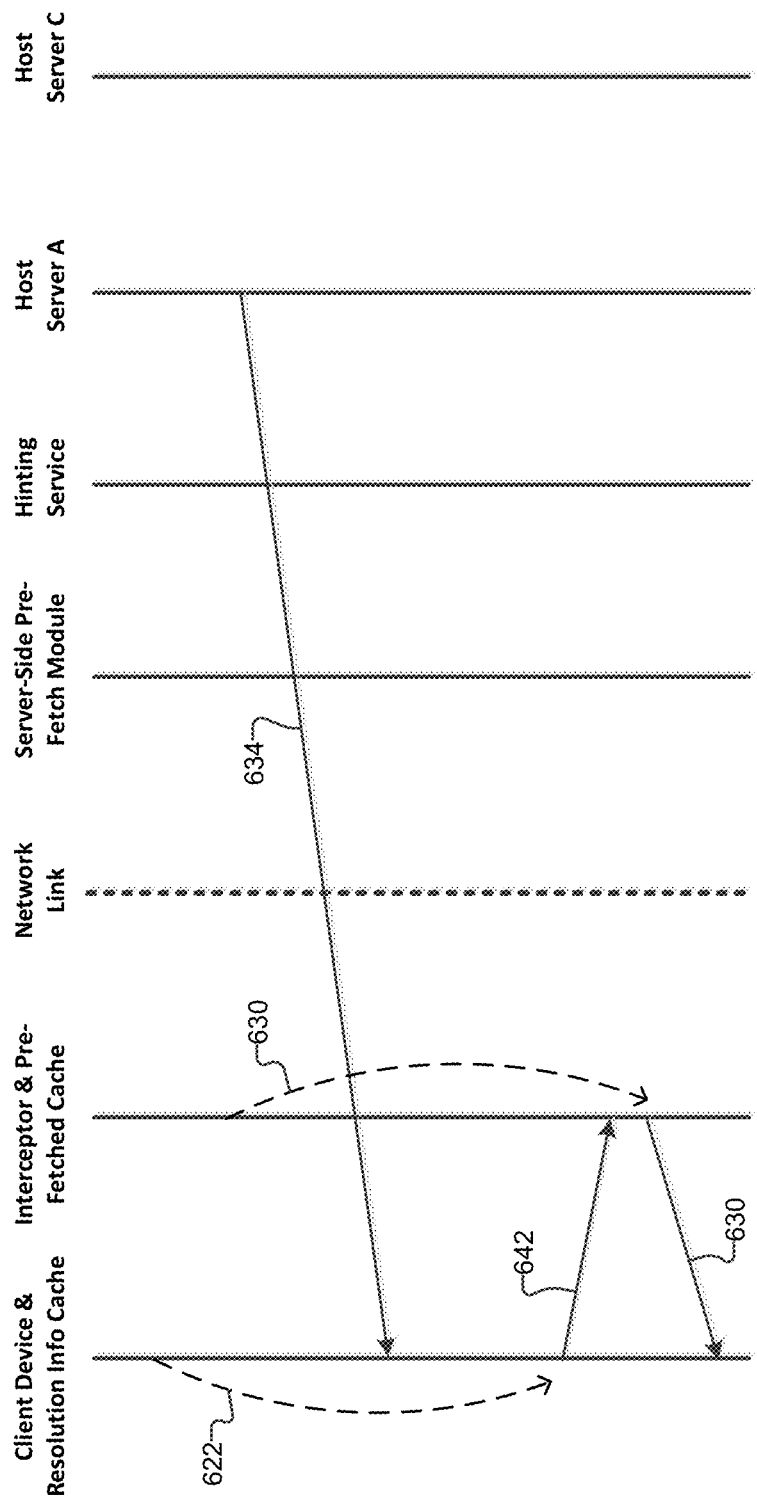

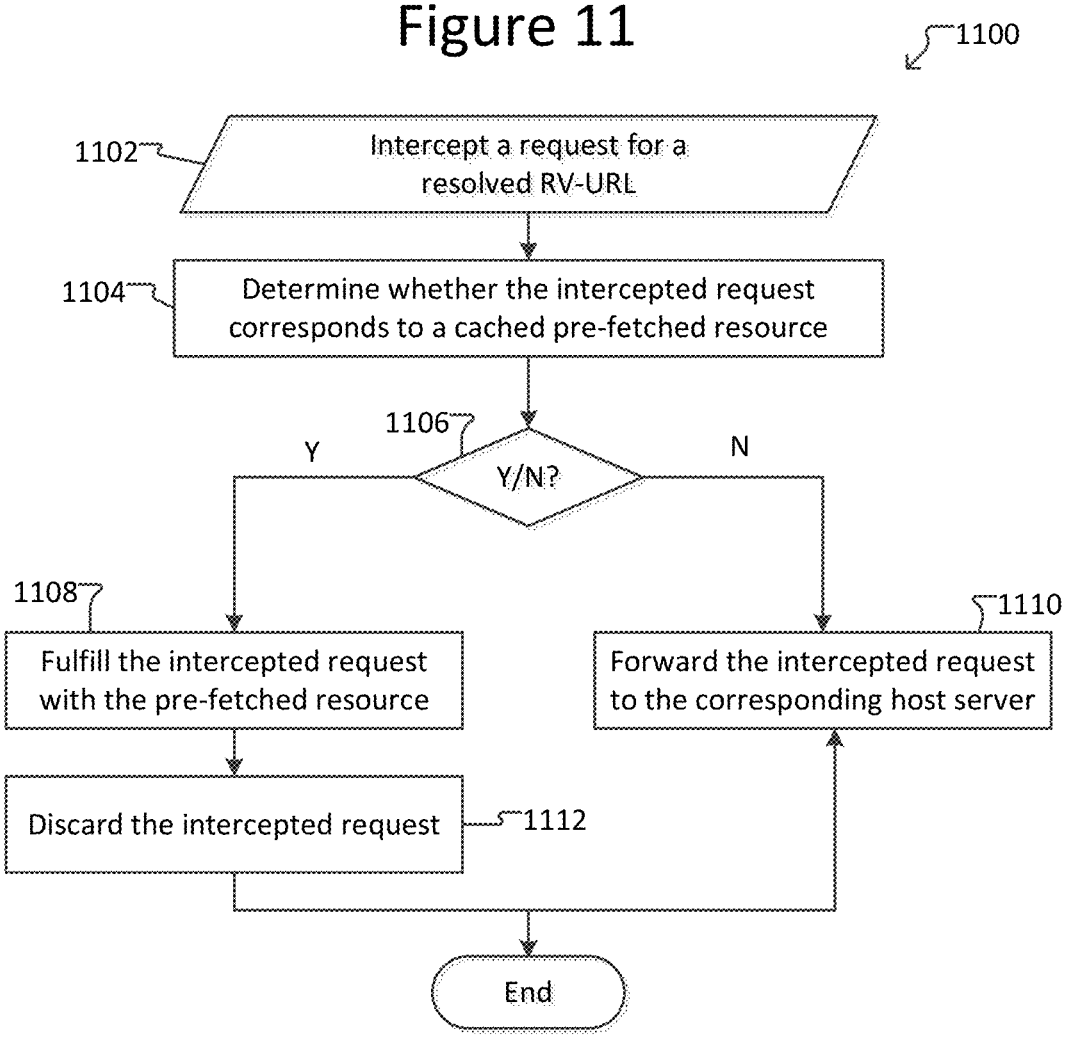

PRE-FETCHING RANDOM-VALUE RESOURCE LOCATORS

BACKGROUND

In modern network systems, a local device (e.g., a Web browser on a personal computer) initiates a network transaction that comprises an initial request to a remote server for a parent resource (e.g., a web page). The parent resource typically includes multiple resources as well as instructions (e.g., universal resource locators (URLs) for requesting additional (i.e., child) resources from other remote devices. The local device executes the network transaction by executing the instructions in the parent resource. Because this can involve fetching numerous child resources from many different remote devices, it can be advantageous to pre-fetch some of the child resources so that those resources are locally stored at or near the local device by the time the local device encounters the instructions to fetch the resources while executing the parent resource.

When a child resource is identified in the parent resource by a static URL, the URL is the same each time the network transaction is executed. The child resource identified by a static URL can be pre-fetched because the URL will be the same at the time of pre-fetch as when it is later encountered in the parent resource. Similarly, dynamic URLs that resolve in predictable ways can be pre-fetched by first learning how the URL is resolved (e.g., during a prior execution of the network transaction). Then, during a subsequent execution of the network transaction, the now known manner of resolving the URL can be used to pre-fetch the resource. Although the URL is dynamic, it resolves to the same value each time it is resolved. The child resource identified by such a dynamic URL can be pre-fetched because the URL will resolve to the same value at the time of pre-fetch as when later encountered in the parent resource.

There are, however, dynamic URLs whose instructions include a function that generates a random value. Each time such a dynamic URL is resolved, it typically resolves to a different value. It has long been thought that such a dynamic URL cannot be pre-fetched because the resource it would point to during pre-fetch and then later when encountered in the parent resource are unlikely to be the same. Some embodiments of the present invention solve the foregoing problem and thus can pre-fetch even random-value URLs and/or provide other benefits.

BRIEF SUMMARY

A random-value universal resource locator (RV-URL) can comprise a variable field and a random-value function for generating a random value for the variable field. Because the variable field will likely contain a different value each time the RV-URL is resolved, it has been thought that RV-URLs cannot be pre-fetched. In some embodiments of the invention, an RV-URL is pre-fetched in anticipation of a client device later requesting the RV-URL while executing a network transaction.

An RV-URL encountered during pre-fetch can be resolved and a request (often referred to herein as a "pre-fetch request") for a resource identified by the resolved RV-URL can be sent to the appropriate host server. The host server can then respond with the resource (often referred to herein as a "pre-fetched resource"), which can be prepositioned on the client-side of the network along with generation information indicating how the pre-fetch request was generated. The generation information can include, for example, the random value of the variable field in the resolved RV-URL.

Later, as the client device encounters RV-URLs while executing the network transaction, the client device first checks a client-side cache for generation information corresponding to the encountered RV-URL. If the client device finds such generation information, the client device uses the generation information to resolve the encountered RV-URL, which should be materially the same as the pre-fetch request previously used to obtain the pre-fetched resource from the host server. If the client device does not find corresponding generation information, the client device resolves the encountered RV-URL by calling the random-value function. Regardless of how the encountered RV-URL is resolved, the client device generates a request for the resolved RV-URL and sends the request to the appropriate host server. An interceptor on the client-side of the network intercepts resource requests and checks a client-side cache for a pre-fetched resource that corresponds to the intercepted request. If the interceptor finds such a pre-fetched resource, the interceptor sends the pre-fetched resource to the client device. If the interceptor does not find a corresponding pre-fetched resource, the interceptor forwards the intercepted resource request across the network to the host server.

BRIEF DESCRIPTION OF THE DRAWINGS

FIG. 3 is an example of a method for pre-fetching random-value URLs according to some embodiments of the invention.

FIG. 8 illustrates an example of a portion of a method for executing a network transaction according to some embodiments of the invention.

FIG. 9 illustrates a first example of operation of the methods of FIGS. 8 and 11 according to some embodiments of the invention.

FIG. 10 shows a second example of operation of the methods of FIGS. 8 and 11 according to some embodiments of the invention.

FIG. 11 is an example of a method for utilizing pre-fetched resources while executing a network transaction according to some embodiments of the invention.

DETAILED DESCRIPTION OF EXEMPLARY EMBODIMENTS

Figure 1:
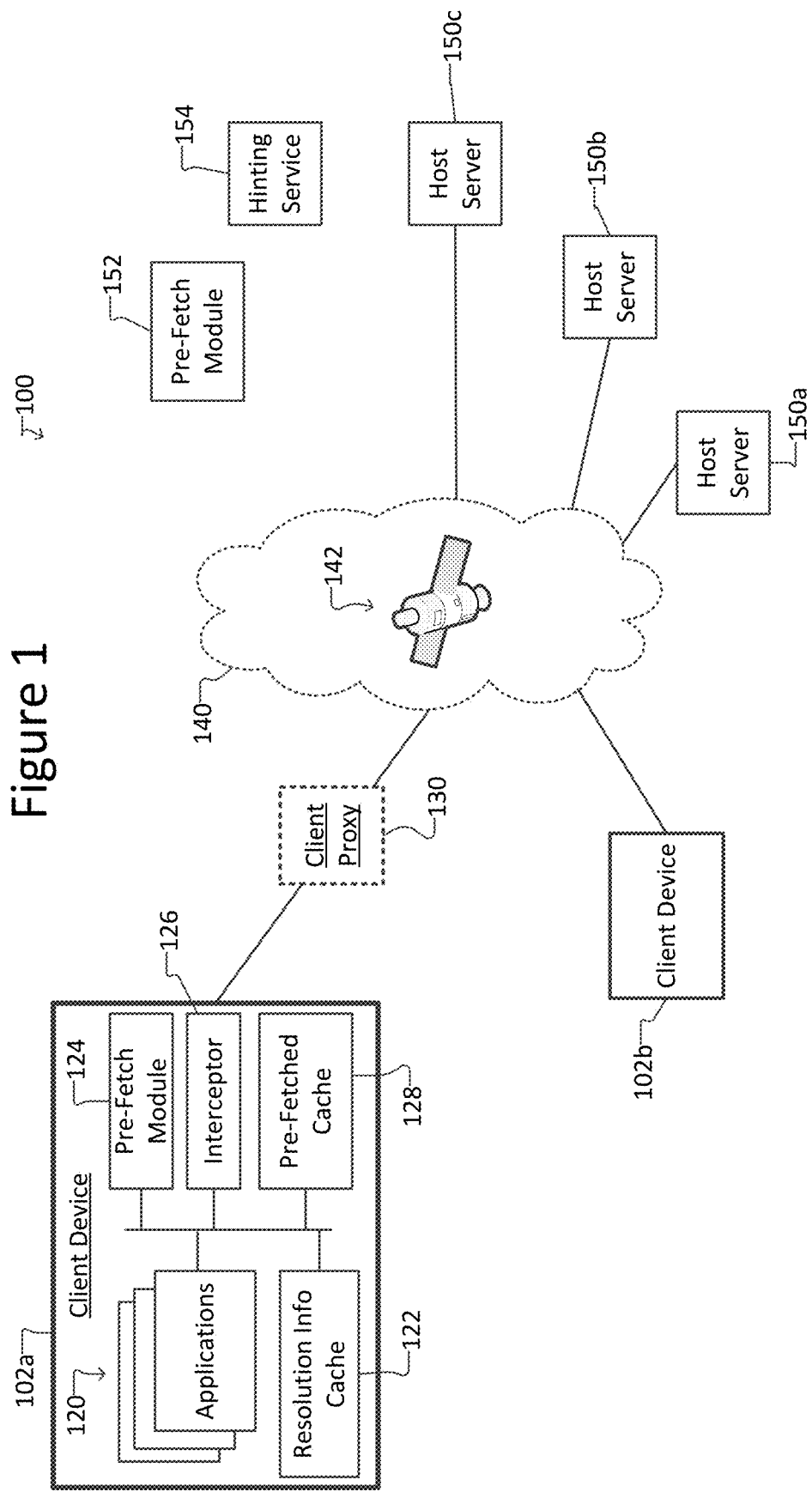
FIG. 1 illustrates an example network system according to some embodiments of the invention.

This specification describes exemplary embodiments and applications of various embodiments of the invention. The invention, however, is not limited to the exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. If used with respect to a numerical value or range, substantially means within ten percent. The term "ones" means more than one.

As used herein, a "network resource" includes a visual (e.g., text, image, video, or the like) object, an audio object, a collection of one or more instructions (e.g., a page encoded in hypertext, a style sheet such as a cascading style sheet (CSS) for displaying and/or playing a network resource, a script file such as a JavaScript file, or the like), or a network service made available and/or provided by one device on a network to other devices upon request by one of the other devices. A "network resource" is sometimes referred to simply as a "resource."

As used herein, a "parent" resource includes, among other elements, one or more instructions to fetch a "child" resource from a specified device. Examples of a parent resource include a web page (e.g., written in a markup language such as hypertext markup language (HTML), extensible markup language (XML), or the like), a media manifest file or other file that references other media objects (e.g., a movie, a prerecorded television show), a service providing access to a streaming media object (e.g., a podcast, a live television broadcast, streaming music, or the like) that references other media objects, a service for transferring a specified data file that references other data objects, or the like. Any of the foregoing can also be a child resource. Additional examples of child resources include images, audio files, video files, style files such as cascaded style sheets (CSS), executable scripts such as JavaScripts, and the like.

A "random-value function" is a function that produces a random or pseudorandom value. Examples of random value functions include a random number generation function, a pseudorandom number generation function, or the like.

As used herein, a "universal resource locator" specifies the location of a network resource and is sometimes abbreviated URL. In some examples, a universal resource locator comprises a "host identifier" and a "resource identifier." The "host identifier" identifies a host server from which a network resource is to be fetched, and the "resource identifier" identifies the network resource. In some examples, the resource identifier is a path to the resource on the host server. As defined and used herein, universal resource locator includes within its meaning but is not limited to what is commonly referred to in Internet or world-wide-web applications as a universal resource locator or URL.

A "dynamic universal resource locator" is a resource locator that includes one or more variable fields and one or more instructions (e.g., function(s)) for generating values for the variable fields. "Resolving" a dynamic universal resource locator means executing the instruction(s) and inserting the resulting value(s) into the variable field(s). The term dynamic universal resource locator is sometimes abbreviated D-URL herein.

A "random-value universal resource locator" is a dynamic universal resource locator in which at least one instruction for generating a value for at least one variable field is a random-value or pseudorandom value function. A random-value universal resource locator is sometimes abbreviated RV-URL herein.

As used with reference to a URL (whether a static URL, a resolved dynamic URL, or a resolved random-value URL) "pre-fetching" or "fetching" means obtaining the resource from the host server identified by the static or resolved URL.

Some embodiments of the present invention facilitate pre-fetching even random-value resource locators (RV-URLs). As noted above, an RV-URL comprises a variable field and a random-value function and is resolved by executing the random-value function and inserting the resulting random value into the variable field. In some embodiments, when an RV-URL is encountered while attempting to pre-fetch resources likely to be needed during execution of a network transaction, the RV-URL is resolved and utilized to send a pre-fetch request to the identified host server. Resolution information indicating the manner in which the RV-URL was resolved during pre-fetch is provided to the client device. When the host server responds with the requested resource (referred to herein as the "pre-fetched resource"), the pre-fetched resource is sent to the client device, which locally caches it. Later, when the client device encounters an RV-URL as part of executing the network transaction, the client device determines whether it has received resolution information indicating how the RV-URL was resolved during pre-fetch. If so, the client device uses the resolution information to resolve the RV-URL to the same value as during pre-fetch. The client device then sends a request for the resolved RV-URL to the relevant host server. An interceptor associated with the client device intercepts the request and determines whether the requested resource has been pre-fetched and locally stored. If yes, the interceptor responds to the request with the locally stored pre-fetched resource and discards the intercepted request. If no, the interceptor forwards the intercepted request to the host server, which responds by sending the requested resource back to the client device.

FIG. 1 shows a high level, block diagram depiction of an example of a system 100 according to some embodiments of the invention. As shown, the system 100 can comprise a network 140 to which one or more client devices 102 (two are shown but there can be fewer or more) and one or more host servers 150 (three are shown but there can be more or fewer) are connected. The network 140 can have one or more communication links 142 between client devices 102 and host servers 150. In some embodiments, the client devices 102 are on one side (sometimes referred to herein as the "client side") of such a communications link 142 or network 140, and the host servers 150 are on an opposite side (sometimes referred to herein as the "server side") of the communications link 142 or network 140. In some embodiments, the communications link 142 is a relatively high latency link such as a satellite link. The communications link 142, however, need not be high latency, and the invention is not limited to operating over a satellite link or any type of high latency link.

A client device 102 can be a computing device such as a desktop or laptop personal computer, a smart cellular telephone, a tablet device, or the like. As such, a client device 102 can comprise any of the hardware and software modules typical of such devices. In FIG. 1, client device 102a is depicted as comprising a plurality of applications 120, a resolution information cache 122, a client-side pre-fetch module 124, an interceptor 126, and a pre-fetched cache 128.

Each application 120 can be, for example, a software module such as one would expect to be on any of the above-mentioned computing devices. One or more of the applications 120 can be configured to execute a network transaction by initially requesting a parent resource from a host server (e.g., 150a) and then fetching additional resources identified in the parent resource from other host servers (e.g., 150b and/or 150c). A web browser is an example of such an application 120, and requesting and rendering a web page (an example of a parent resource) is an example of a network transaction. A media player is another example of an application 120, and requesting and consuming a media manifest (which is another example of a parent resource) is another example of a network transaction.

As will be seen, the resolution information cache 122, server-side pre-fetch module 124, interceptor 126, and pre-fetched cache 128 can work with the hinting service 154 and server-side pre-fetch module 152 to identify and pre-fetch one or more of the additional resources that the client device 102a may need before the client device 102a encounters instructions to fetch those resources in the parent resource. And those additional resources can be pre-fetched even if the resources are identified in the parent resource by RV-URLs.

In FIG. 1, the resolution information cache 122, client-side pre-fetch module 124, interceptor 126, and pre-fetched cache 128 are illustrated as modules of client device 102a. In other embodiments, one or more of those modules can alternatively be in a separate computing device such as a client proxy device 130 to which the client device 102a is connected. For example, in some embodiments, pre-fetched cache 128, pre-fetch module 124, and interceptor 126 can be part of a client proxy 130, while resolution information cache 122 is part of the client device 102a (e.g., part of an application 120 executing a network transaction). Regardless, although not shown, client device 102b can be configured like client device 102a.

The network 140 can comprise a single network of interconnected computing devices, a plurality of interconnected single networks, or the like. For example, the network 140 can comprise one or more local area networks (LANs), wide area networks (WANs), or the like. Individual networks that comprise the network 110 can be public and/or private. All or part of the network 140 can be part of the world-wide web (a.k.a. the public Internet). In some embodiments, the network 140 can be the public Internet.

Host servers 150 can store and provide network resources to other entities (e.g., a client device 102) over the network 140. Examples of host servers 150 include web page servers, media servers, email servers, file transfer protocol (FTP) servers, or the like. Examples of resources a host server 150 might provide include web pages, images, audio files, video files, text files, streaming content, or the like.

The hinting service 154 can be configured to provide services that may be used to accelerate execution of a network transaction. In some embodiments, each time a device (e.g., client device 102b) that is subscribed to the hinting service 116 completes a network transaction, the hinting service 154 collects information regarding the network transaction and generates hints that can thereafter be used by another subscribing device (e.g., client device 102a) to execute the same network transaction more efficiently and thus typically in a shorter amount of time. The pre-fetch module 152 can be configured to receive hints from the hinting service 154 for a particular network transaction and pre-fetch resources identified in the hints.

Figure 4A:
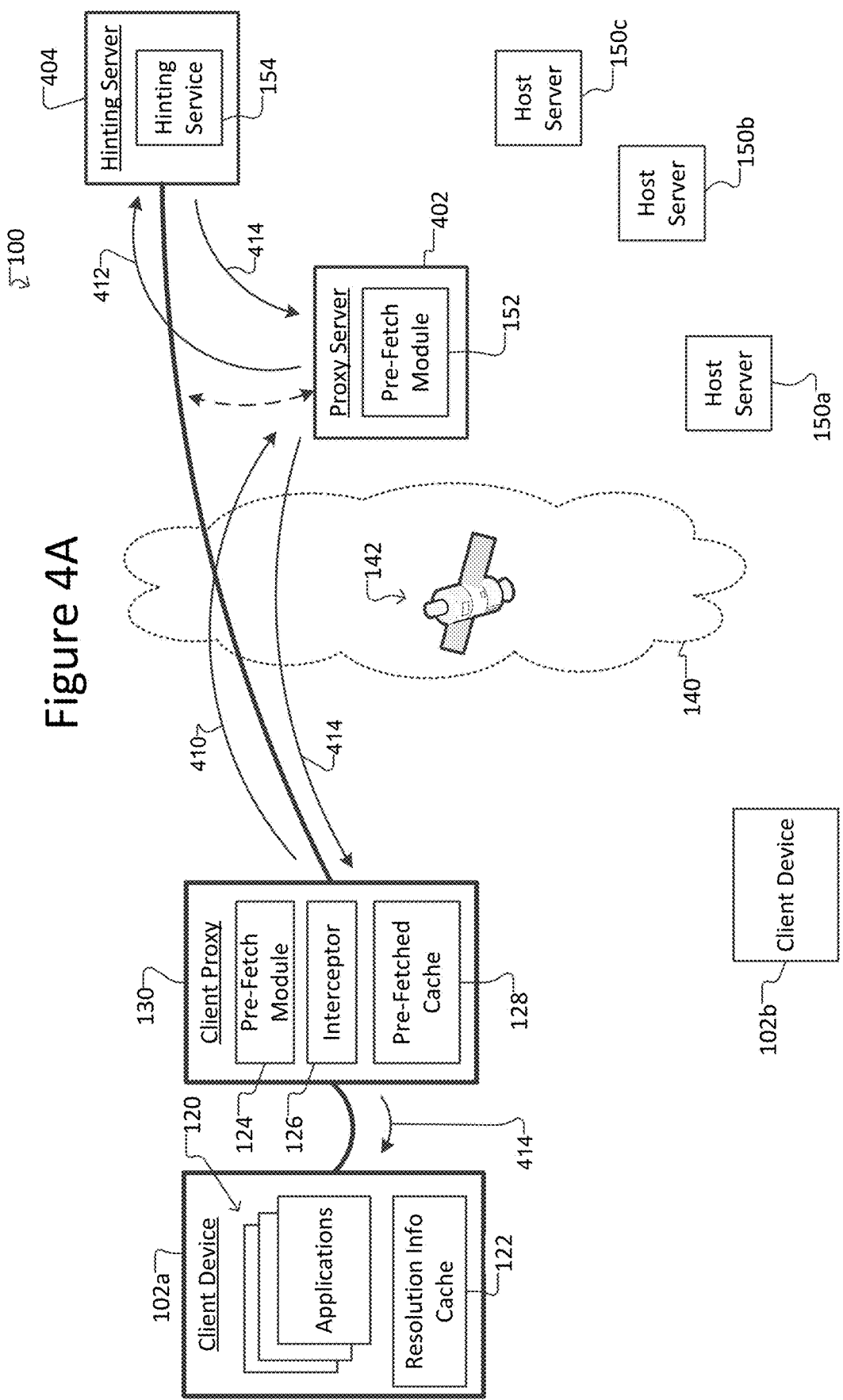
FIGS. 4A-5 illustrate a first example of the method of FIG. 3 according to some embodiments of the invention.
Figure 4B:
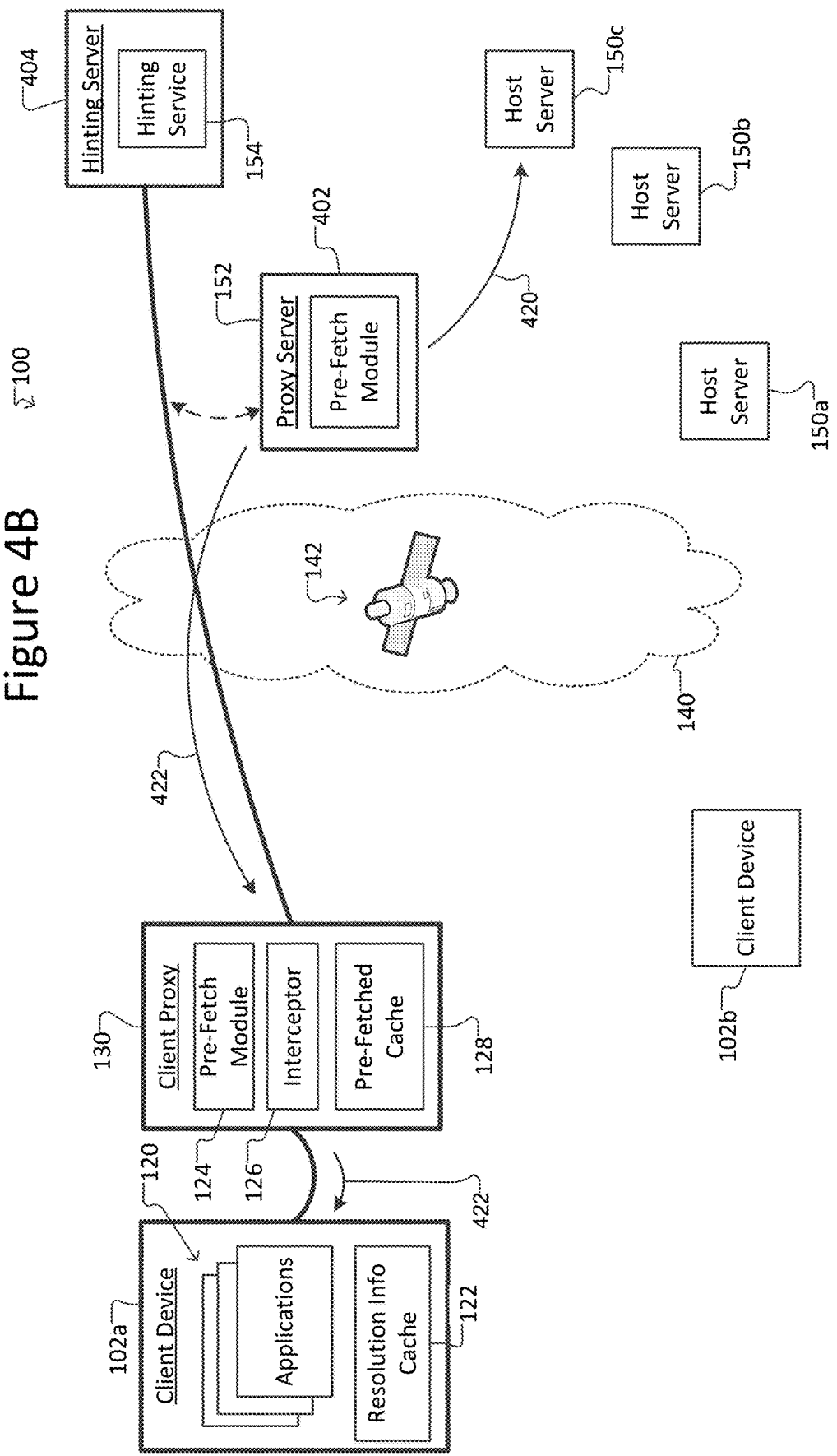
Figure 4C:
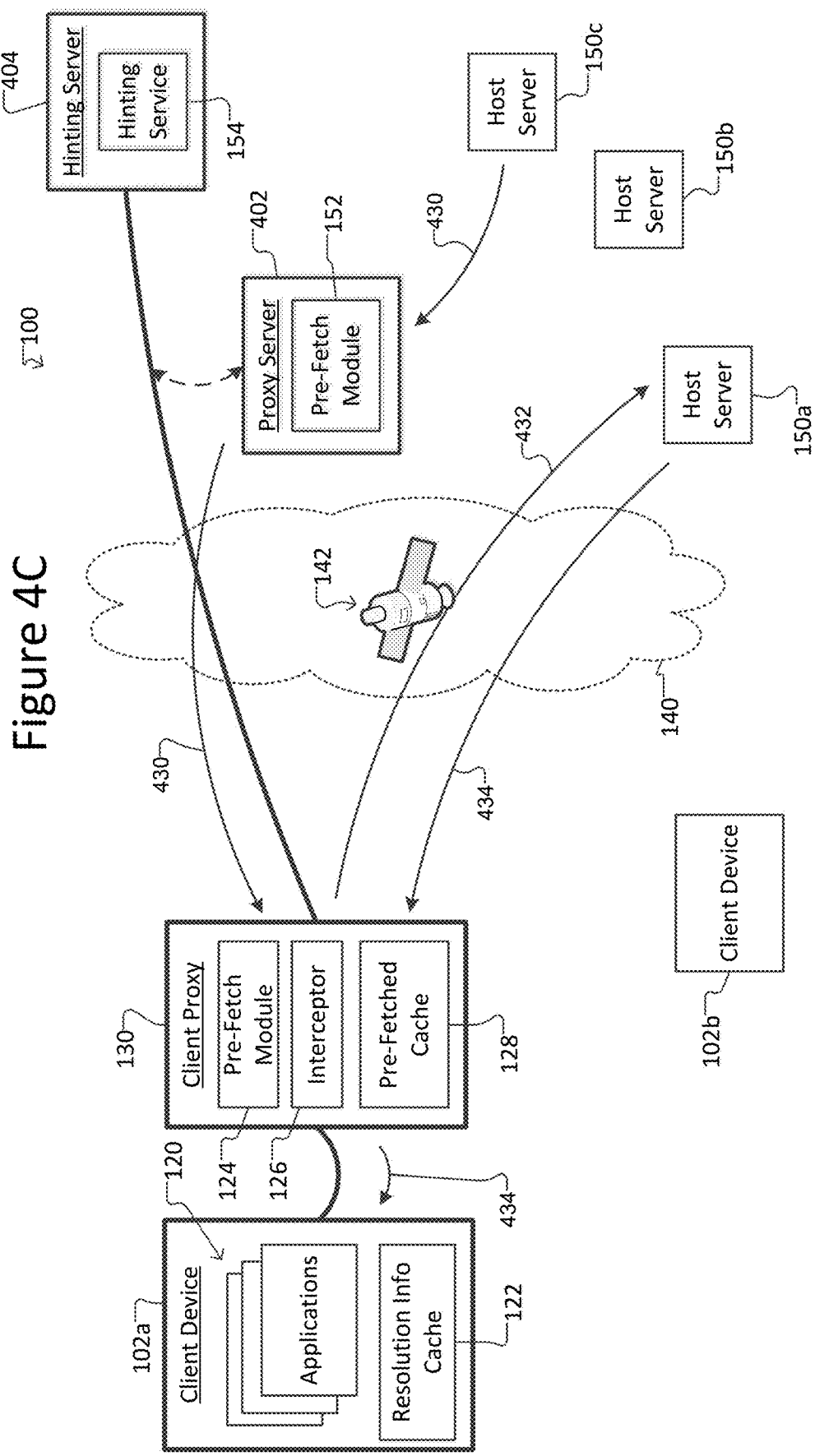
Figure 6A:
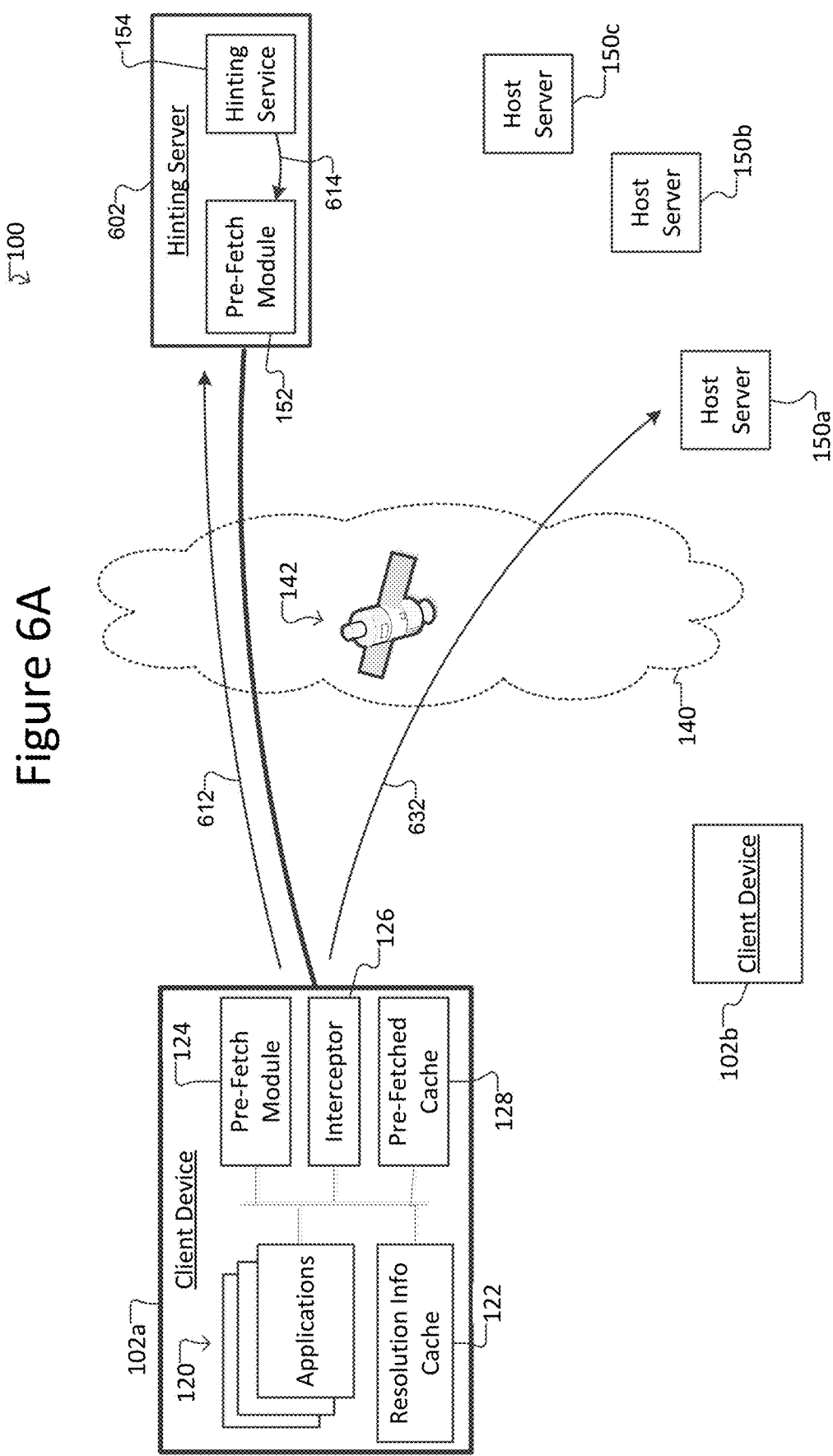
FIGS. 6A-7 illustrate a second example of the method of FIG. 3 according to some embodiments of the invention.
Figure 6B:
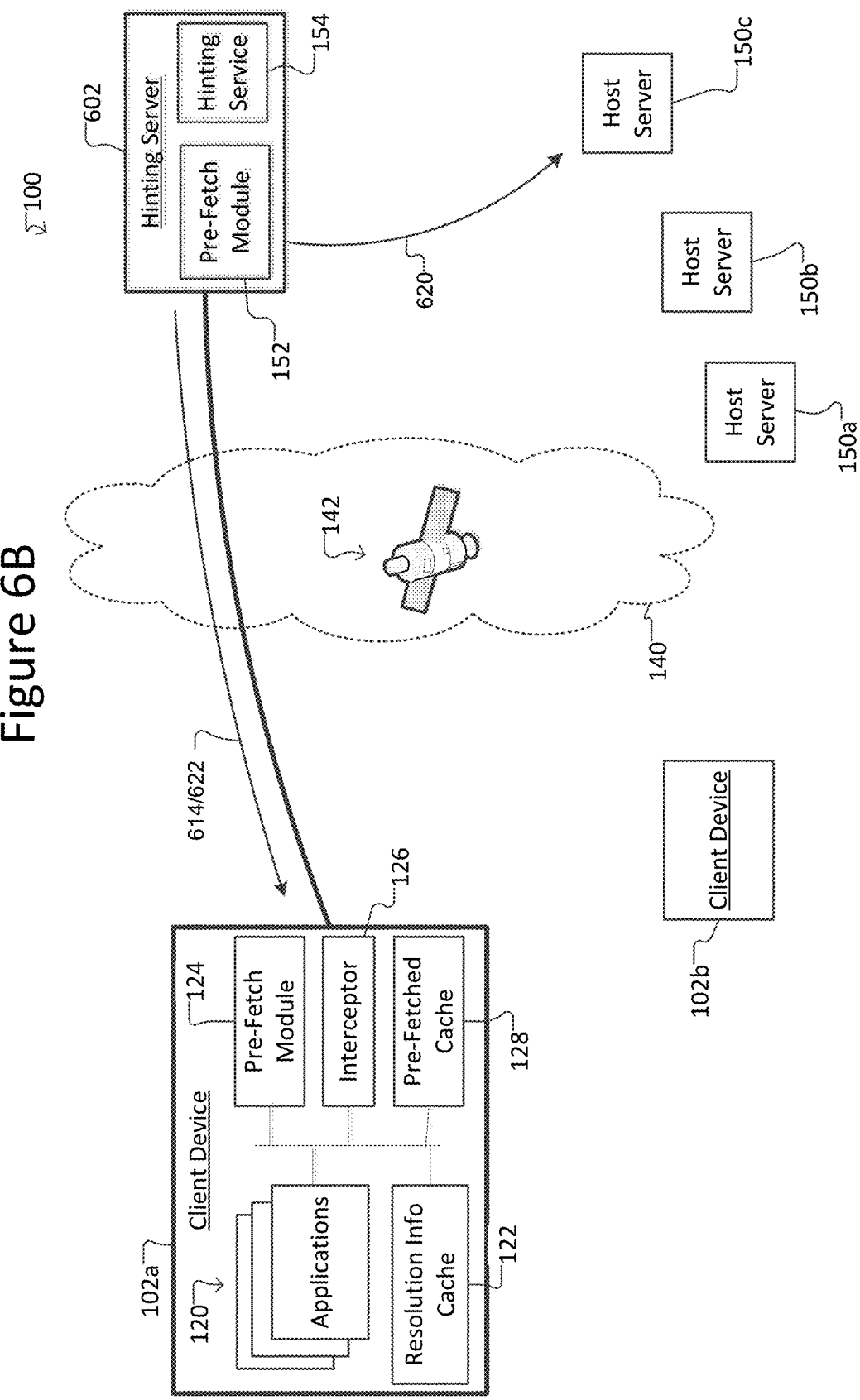
Figure 6C:
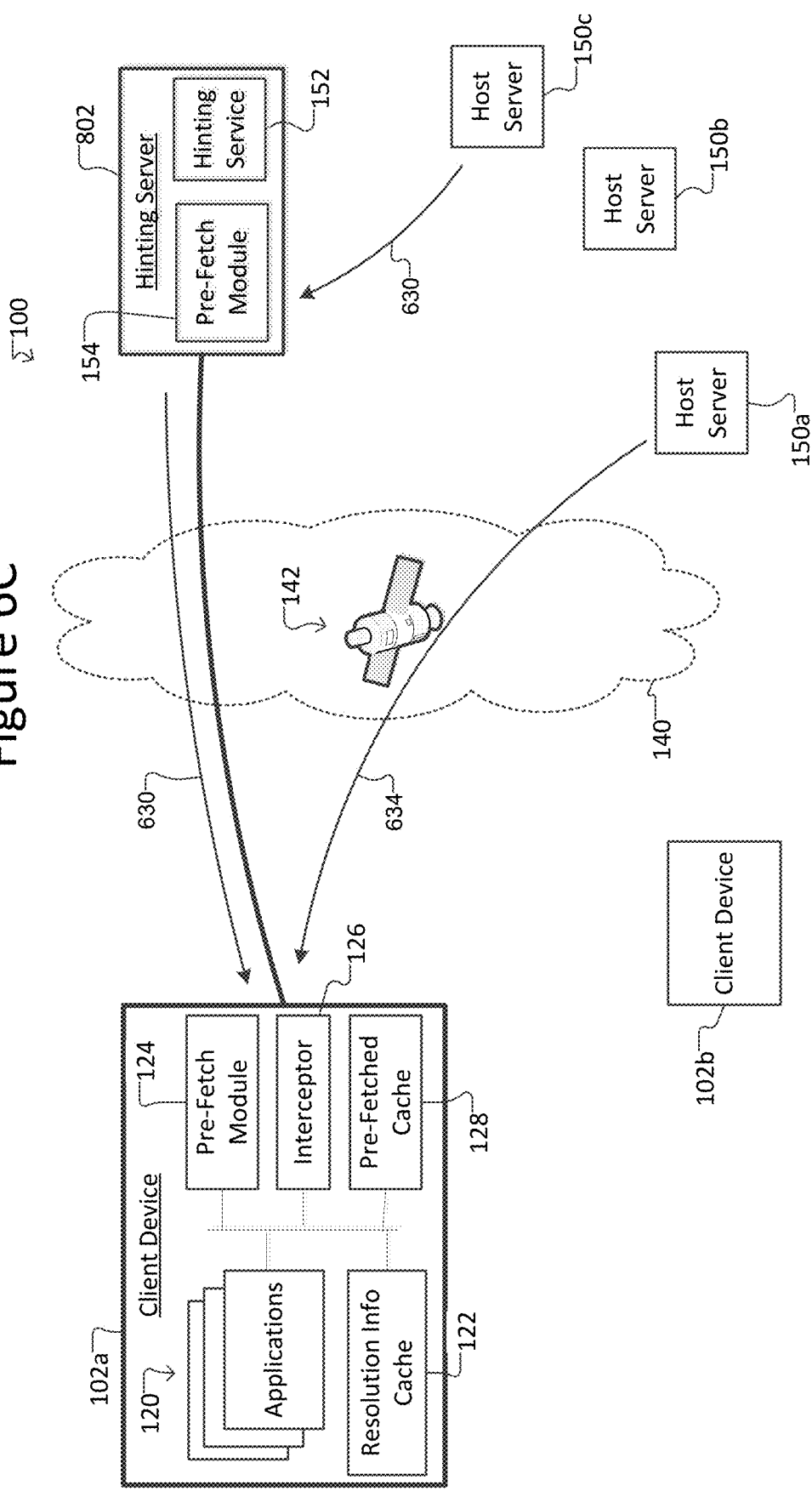

Although not shown in FIG. 1, the server-side pre-fetch module 152 and the hinting service 154 can reside on one computing device or multiple computing devices. For example, the server-side pre-fetch module 152 can reside on a proxy server (not shown in FIG. 1), and the hinting service 154 can reside on a hinting server (not shown in FIG. 1). An example of the foregoing is illustrated in FIGS. 4A-4C. In other examples, the server-side pre-fetch module 152 and the hinting service 154 can reside on the same computing device (not shown in FIG. 1). An example is illustrated in FIGS. 6A-6C. Regardless, in some embodiments, the server-side pre-fetch module 152 and hinting service 154 can be on the server-side of the communications link 142.

When an application 120 of a client device 102a has or is expected to begin executing a network transaction in which it will fetch resources, the server-side pre-fetch module 152 can receive hints from the hinting service 154 that identify one or more of those resources. Some such resources are identified in the hints by RV-URLs. When the server-side pre-fetch module 152 encounters such RV-URLs in the hints, the server-side pre-fetch module 152 can resolve and pre-fetch the RV-URLs. For each such resolved and pre-fetched RV-URL, the server-side pre-fetch module 152 sends to the client-side pre-fetch module 124 both the pre-fetched child resource and resolution information indicating how the server-side pre-fetch module 152 resolved the RV-URL. The client-side pre-fetch module 124 can then store the resolution information in the resolution information cache 122 and the pre-fetched child resource in the pre-fetched cache 128.

Later, as the application 120 encounters RV-URLs while executing the network transaction, the application 120 resolves each RV-URL and generates a request to the appropriate host server 150. The application 120 resolves each RV-URL by determining whether resolution information previously stored in the resolution information cache 122 corresponds to the RV-URL. If yes, the application 120 uses the resolution information to resolve the RV-URL to have the same random value as the pre-fetched module 154 previously used to pre-fetch a corresponding child resource. If no, the application 120 resolves the RV-URL by executing the corresponding random-value function and inserting the resulting random value into the variable field of the RV-URL. Regardless of which way the RV-URL was resolved, the application 120 sends a request for the child resource to the host server 150 identified by the resolved RV-URL.

The interceptor 126 intercepts requests generated by the application 120 and determines whether each intercepted request corresponds to a pre-fetched child resource stored in the pre-fetched cache 128. If yes, the interceptor 126 responds to the intercepted request with the pre-fetched child resource from the pre-fetched cache 128 and discards the intercepted request. If no. the interceptor 126 forwards the intercepted request to the corresponding host server 150.

Figure 2:
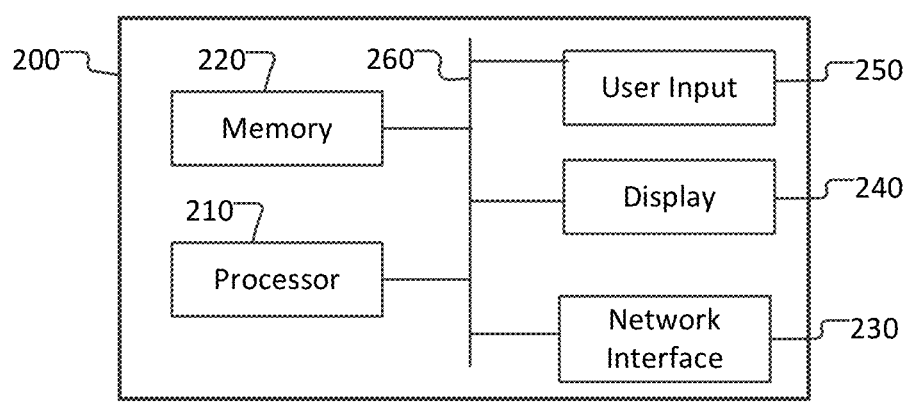
FIG. 2 shows an example of a computing device.

FIG. 2 illustrates an example computing device 200 suitable for use in system 100 of FIG. 1. Any one or more of the client devices 102 and/or host servers 150 can comprise a computing device that is the same as or similar to computing device 200 of FIG. 2. Likewise, if a client proxy 130 is included in system 100, the client proxy 130 can operate on a computing device like device 200. Likewise, the hinting service 154 and server-side pre-fetch module 152 can operate on one or multiple distinct computing devices like 200. For example, each of the proxy server 402 and hinting server 404 of FIGS. 4A-4C and/or the hinting server 602 of FIGS. 6A-6C can likewise be the same as or similar to the computing device 200 of FIG. 2.

As shown, the computing device 200 can include a processor 210, a memory 220, a network interface 230, a display 240, and one or more user input device 250. Each of these components can be in communication with the other components via one or more communications buses 260. The computing device 200 illustrated in FIG. 2 is but an example, and many variations are possible. For example, while the example shown in FIG. 2 includes a user input device 250 and a display 240, such components are optional and may not be present in some examples, such as in some examples used as servers such as host servers 150, one or more servers on which the hinting service 140 and the server-side pre-fetch module 152 is located, and/or a server on which a client proxy 130 is located.

Suitable network interfaces 230 may employ wireless Ethernet, including 802.11 a, g, b, or n standards. In one example, the network interface 230 can communicate using Radio Frequency (RF), Bluetooth, CDMA, TDMA, FDMA, GSM, Wi-Fi, satellite, or other cellular or wireless technology. In other examples, the network interface 230 may communicate through a wired connection and may be in communication with one or more networks, such as Ethernet, token ring, USB, FireWire 1394, fiber optic, etc.

Any configuration of the memory 220 and processor 210 can be such that computer readable instructions (e.g., software, microcode, firmware, or the like) are stored in memory 220 as non-transient signals. The memory 220 can be a non-transient digital memory device. Such instructions can cause the processor 210 to perform one or more functions, methods, or the like. For example, such instructions can cause the processor 210 to perform all or part of any of method 300 of FIG. 3, method 800 of FIG. 8, and/or method 1100 of FIG. 11. Alternatively, any configuration or instance of the computing device 200 can comprise hardwired logic (not shown) that causes the computing device 200 to perform all or any part of the foregoing methods. As yet another alternative, any configuration or instance of the computing device 200 can comprise a combination of non-transient computer readable instructions stored in the memory 220 that can be executed by the processor 210 and hardwired logic (not shown) that causes the computing device 200 to perform all or any part of the foregoing methods.

As noted, each client device 102, the client proxy 130 (if present), and the one or more computing devices on which the server-side pre-fetch module 152 and hinting service 154 operate can comprise one or more computing devices like device 200. Each application 120, the client-side pre-fetch module 124, the interceptor 126, the server-side pre-fetch module 152, and/or the hinting service 154 can thus comprise hardwired logic (not shown) and/or non-transient computer readable instructions stored in memory 220 that can be executed by the processor 210 in one or more computing devices like 200. Similarly, the pre-fetched cache 128 and the resolution information cache 122 can be part of the memory 220 or a similar memory (not shown) of one or more computing devices like 200.

FIG. 3 illustrates an example of a method 300 for pre-fetching RV-URLs. For ease of illustration and discussion, method 300 is described as being performed on the system 100 of FIG. 1, and two examples of operation of method 300 are provided. Method 300 is not, however, limited to being performed on system 100, nor is method 300 limited to any aspect of either of the examples.

Figure 5:
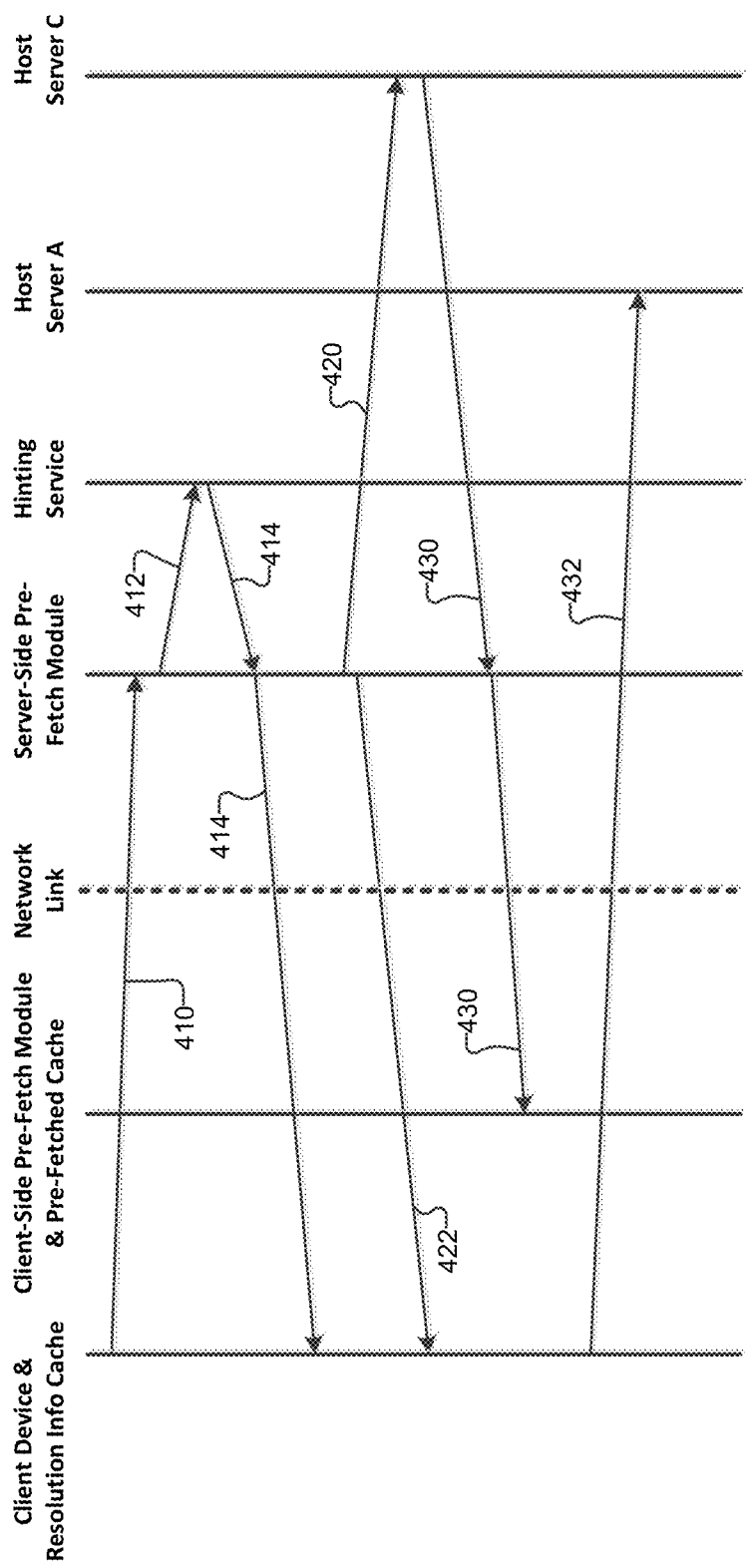

The first of the examples is depicted in FIGS. 4A-5. In example 1, it is assumed that the pre-fetch module 152 is on a proxy server 402 (see FIGS. 4A-4C) and the hinting service 154 is located on a different computing device 404.

In example 1, it is also assumed that the proxy server 402 is able to snoop communications between client devices 102 and the hinting service 154 and/or other devices on the network 140 such as one or more of the host servers 150. Also in example 1, the pre-fetch module 124, interceptor 126, and pre-fetched cache 128 are on a client proxy device 130.

Figure 7:
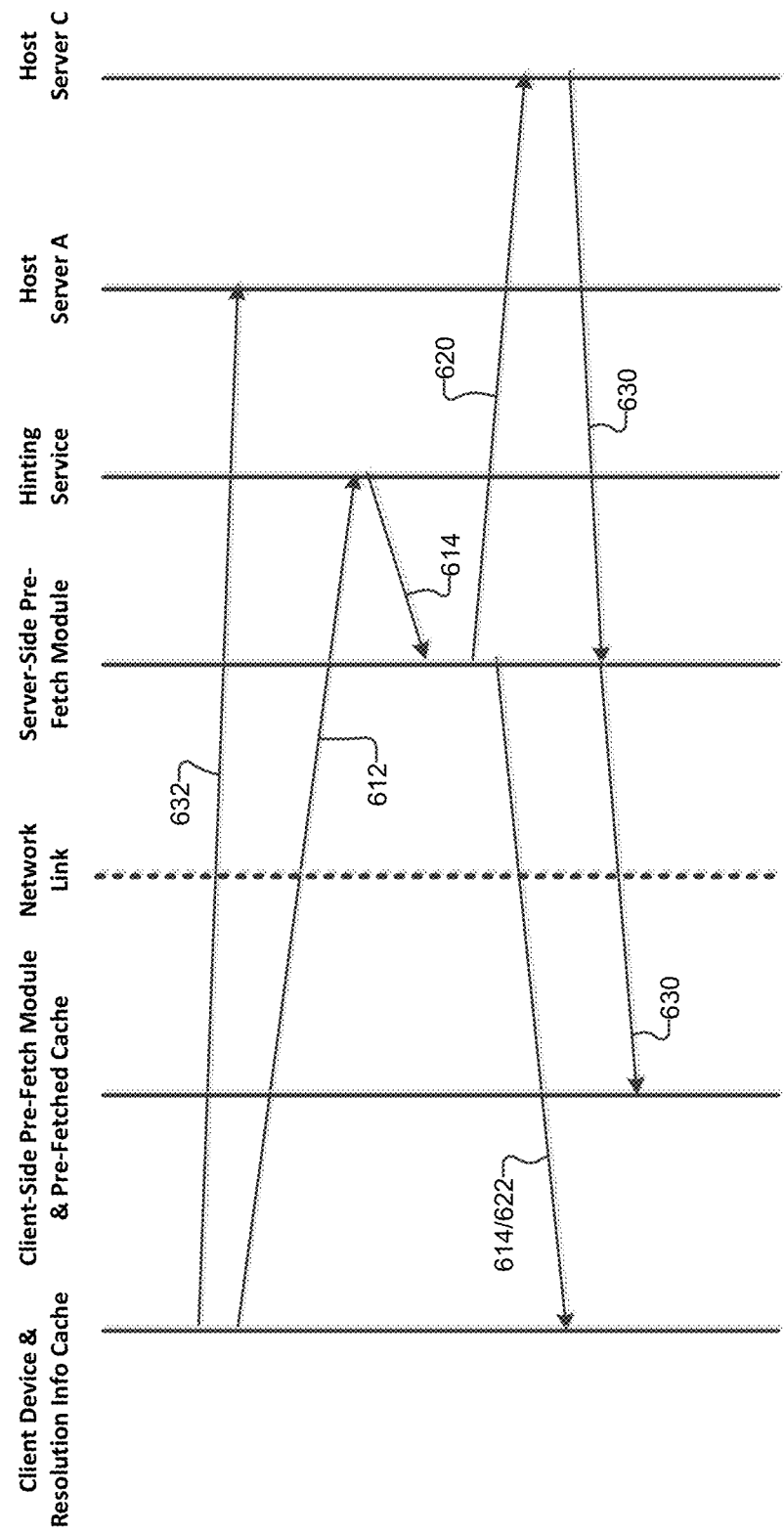

The second of the examples is shown in FIGS. 6A-7. In example 2, it is assumed that the server-side pre-fetch module 152 is co-located with the hinting service 154 on the same computing device 602 (see FIGS. 6A-6C). In the configuration illustrated by example 2, it is assumed that communications between client devices 102 and the hinting service 154 may be encrypted and thus not "snoopable" by a proxy server like 402 of FIG. 4A. Also in example 2, the pre-fetch module 124, interceptor 126, and pre-fetched cache 128 are part of the client device 102a.

At block 302, an event is detected in system 100 that triggers a request to the hinting service 154 for hints for a particular network transaction. The event can be any event that indicates a client device 102a has, might, or probably will initiate the network transaction.

The following are examples of events that can trigger a client device 102a to expressly request from the hinting service 154 hints for a particular network transaction. One such example occurs when a user of an application 120 (e.g., a web browser) of device 102a selects a URL of a particular web page or resource. As another example, the trigger can be an action that indicates a probability that the user will select a URL of a particular web page or resource. An example of such an action indicating a probability the user will select a particular URL is a cursor of a user input device hovering over a selectable display of the URL on the client device 102a. Another example is an action that, due to the user's browsing history, indicates a probability that the URL will be selected by the user. For example, the browsing history may indicate that the user typically selects the URL upon or shortly after powering on the client device 102a, starting one of the applications 120, or the like.

Examples of events that can trigger another system 100 device to request hints from the hinting service 154 include the following. On such example is a request by a client device 102a to a domain name system (DNS) server. For example, a DNS request can be detected by proxy server 402, which then sends a hints request to the hinting service 154 for a network transaction associated with the DSN request. As another example, even if a client device 102a itself is not configured to request hints from the hinting service 154, a proxy server 402 can detect a request by the client device 102a to a host server 150a for a particular URL or resource, and the proxy server 402 can then request from the hinting service 154 hints associated with the network transaction that corresponds to the requested URL or resource.

As noted above, the method 300 of FIG. 3 is discussed with respect to two examples. It is noted that the examples also illustrate examples of different possible triggers.

In example 1 (illustrated in FIGS. 4A-5), a user of a web browser application (e.g., one of applications 120) of client device 102a hovers a mouse cursor over a URL for a web page www.example1.com. The mouse hover event is labeled 410 in FIGS. 4A and 5. The mouse hover 410 is detected (e.g., by the server-side pre-fetch module 152) at block 302 of FIG. 3 as an event indicating the possibility that client device 102a will request the web page www.example1.com.

In example 2 (illustrated in FIGS. 6A-7), a user of a web browser application 120 of client device 102a selects (e.g., clicks on) a URL for the web page www.example2.com. The mouse click is not illustrated in FIGS. 6A and 7, but as noted below, the resulting request from client device 102a for www.example2.com is labeled 632 in FIGS. 6A and 7.

At block 304, in response to the trigger detected at block 302, a request for hints associated with the particular network transaction is sent to the hinting service 154. The request for hints can originate from any of a number of possible sources including the client device 102a, a client proxy 130, the proxy server 402, or the like.

In example 1, the proxy server 402 detects the mouse hover at block 302 and sends, at block 304, a request 412 to the hinting service 154 for hints associated with rendering the web page www.example1.com. (See FIGS. 4A and 5.) In example 2, the event of block 302 is the client device 102a selecting (e.g., clicking) a URL representing www.example2.com, and the client device 102a itself sends, at block 304, a request 612 to the hinting service 154 for hints associated with rendering the web page www.example2.com. (See FIGS. 6A and 7.)

Assuming the hinting service 154 has hints for the particular network transaction, the hinting service 154 responds by sending the hints, which are received at block 306. The hinting service 154 can send the hints to, which can thus be received by, any of a number of possible entities including the client device 102a, the client proxy 130, the server-side pre-fetch module 152, the proxy server 402, or the like. Alternatively, the hints can be sent to one entity on the network (e.g., the client device 102a) and also intercepted by another entity (e.g., the server-side pre-fetch module 152).

In example 1, the hinting service 154 sends hints 414 for rendering the web page www.example1.com to the proxy server 402. (See FIGS. 4A and 5.) In example 2, the hinting service 154 sends hints 614 for rendering the web page www.example2.com to the server-side pre-fetch 152. (See FIGS. 6A and 7.)

At block 308, RV-URLs are encountered in the hints. The presence of each RV-URL in the hints indicates a possibility, a probability, or a certainty that the client device 102a will eventually resolve and request the RV-URL as part of executing the particular network transaction. Block 308 can be performed by a number of possible entities including the server-side pre-fetch module 152. Alternatively, all or part of block 308 can be performed by the client proxy 130 or the client device 102a (e.g., the server-side pre-fetch module 152, one of the applications 120, or the like). In both examples 1 and example 2, the server-side pre-fetch module 152 performs some processing of the hints (e.g., to identify and pre-fetch resources) received from the hinting service 154 and, in doing so, encounters RV-URLs in the hints. As shown in FIG. 3 by block 320, the hints can also be provided at some point in time to the client device 102a (e.g., to the application 120 that is expected to execute the network transaction). Alternatively, the hints can be provided at block 320 to the client proxy 130.

Blocks 310 through 318 are now executed for each RV-URL identified at block 308.

At block 310, one of the RV-URLs encountered at block 308 is resolved. As discussed above, an RV-URL can comprise a host identifier and a resource identifier, which includes at least one variable field and identifies a random-value function for producing a random or pseudorandom value for the variable field. (Hereinafter, for simplicity, only the term random is used, but it is to be understood that "random" includes "pseudorandom.") Resolving the RV-URL comprises executing the random-value function to produce a random value and then inserting the random value into the variable field.

In both examples 1 and example 2, it is assumed that the following RV-URL was encountered at block 308 in the hints for www.example1.com and the hints for www.example2.com: "hostserver150*c*/FILE-{variable field}," and a random number generator is identified as the function for generating a value for the variable field. In this example, "hostserver150*c*" is the host identifier portion of the RV-URL, "FILE-{variable field}" is the resource identifier portion, and a random number generator is the identified function.

In example 1, the server-side pre-fetch module 152 of FIGS. 4A-4C calls the random number generator, which produces a random number such as "1593." In example 1, the pre-fetch module 152 in FIGS. 4A-4C thus resolves the RV-URL "hostserver150*c*/FILE-{variable field}" to "host-150*c*/FILE-1593." In example 2, the pre-fetch module 152 in FIGS. 6A-6C calls the random number generator, which produces a random number such as "3117." In example 2, the pre-fetch module 152 in FIGS. 6A-6C thus resolves the RV-URL "hostserver150*c*/FILE-{variable field}" to "host-150*c*/FILE-3117."

At block 312, a pre-fetch request for the RV-URL resolved at block 310 is generated. As noted, a resolved RV-URL points to a particular resource on a particular host. The pre-fetch request generated at block 312 can thus be a request to that particular host for the identified resource. Examples of such requests include an HTTP or HTTPS Get command.

In example 1, the pre-fetch module 152 of FIGS. 4A-4C generates a pre-fetch request addressed to host server 150*c* for the resource at "FILE-1593." In example 2, the pre-fetch module 152 generates a pre-fetch request addressed to host server 150*c* for the resource at "FILE-3117."

At block 314, information regarding resolution of the RV-URL at block 310 is provided to the client-side pre-fetch module 124, which can store the "resolution information" in the resolution information cache 122. As will be seen, the client device 102a (e.g., the application 120 executing the network transaction) will use this resolution information to resolve the RV-URL to the same value when the RV-URL is later encountered by the client device 102a while executing the network transaction.

The resolution information may take any of a number of forms. For example, the resolution information can be the random value generated by the random-value function, the resolved RV-URL generated at block 310, the pre-fetch request generated at block 312, or the like. Moreover, the resolution information may be sent to the client device 102a in any number of possible ways. For example, the resolution information may be added to the hints received from the hinting service 154 (see block 306), which can occur prior to performing block 320. The resolution information can thus be in the hints (e.g., stored in association with the RV-URL) when the hints are sent to the client device 102a (or proxy client 130) at block 320. As another example, the resolution information may be sent directly to the client device 102a (or proxy client 130) in which case block 320 can be performed prior to block 314. Regardless, the resolution information can be cached in the resolution information cache 122.

In example 1, the server-side pre-fetch module 152 of FIGS. 4A-4C sends, to client-side pre-fetch module 124, resolution information 422 in the form of the pre-fetch request generated at block 312, namely, the pre-fetch request addressed to host server 150c for the resource at "FILE-1593." (See FIGS. 4B and 5.) In example 2, the pre-fetch module 152 of FIGS. 6A-6C adds the resolution information (in this example, the pre-fetch request for "FILE-3117" addressed to host server 150c) to the hints 614 received from the hinting service 154 (see block 306) and later sends the hints 614 with the resolution information 622 to the client-side pre-fetch module 124 (see FIGS. 6B and 7) at block 320.

At block 316, the RV-URL resolved at block 310 is pre-fetched. This can be accomplished by sending the pre-fetch request generated at block 312 to the designated host server 150c. In example 1, the pre-fetch module 152 of FIGS. 4A-4C sends, to host server 150c, the pre-fetch request 420 for the resource at "FILE-1593" (see FIGS. 4B and 5). In example 2, the pre-fetch module 152 of FIGS. 6A-6C sends, to host server 150c, the pre-fetch request 620 for the resource at "FILE-3117" (see FIGS. 6B and 7).

At block 318, a pre-fetched resource is received from the host server 150c and sent to the client-side pre-fetch module 124, where it can be cached in the pre-fetched cache 128 in anticipation of the client device 102a later requesting the pre-fetched resource while executing the network transaction. Block 318 can be accomplished by receiving the pre-fetched resource from the host server 150c to which the pre-fetch request was sent as part of block 316, and sending the received pre-fetched resource to the client-side pre-fetch module 124, which can store the pre-fetched resource in the pre-fetched resource cache 122.

In example 1, the pre-fetch module 152 of FIGS. 4A-4C receives the pre-fetched resource 430 located at "FILE-1593" on host server 150c and forwards the pre-fetched resource 430 to the client-side pre-fetch module 124, which stores the pre-fetched resource 430 in the pre-fetched cache 128. (See FIGS. 4C and 5.) In example 2, the pre-fetch module 152 of FIGS. 6A-6C receives the pre-fetched resource 630 located at "FILE-3117" on host server 150c and forwards the pre-fetched resource 630 to the client-side pre-fetch module 124, which stores the pre-fetched resource 630 in pre-fetched cache 128. (See FIGS. 6C and 7.)

Method 300 has now resolved an RV-URL encountered in the hints for a particular network transaction with a generated random number and pre-fetched the resolved RV-URL. Moreover, the pre-fetched resource and sufficient resolution information to resolve the RV-URL to the same value has been cached at the client device 102a and/or a client proxy 130 associated with the client device 102a.

Operation of method 300 with respect to example 1 is summarized in FIG. 5, which illustrates that the pre-fetched resource 430 is locally stored in pre-fetched cache 128 and resolution information 422 is locally stored in resolution information cache 122. Example 2 is summarized in FIG. 7, which illustrates that the pre-fetched resource 630 is locally stored in pre-fetched cache 128 and resolution information 622 is locally stored in resolution information cache 122. As noted, blocks 310-318 can be repeated for each RV-URL encountered in the hints at block 308.

Each of blocks 302-318 of method 300 can be performed by the server-side pre-fetch module 152. Alternatively, one or more of blocks 302-318 can be performed by another network entity such as client proxy 130 or one or more modules in a client device 102a.

FIGS. 8 and 11 illustrate examples of methods 800 and 1100 by which a client device 102 (and/or a client proxy 130 if included in system 100) utilizes resources pre-fetched by the method 300 of FIG. 3 to accelerate execution of the particular network transaction for which hints were obtained by method 300 FIG. 3. For ease of illustration and discussion, method 800 is described as being performed by an application 120 of device 102a and method 1100 is described as being performed by the interceptor 126 of system 100 of FIG. 1. Moreover, the same two examples as discussed above with respect to method 300 are continued to illustrate operation of methods 800 and 1100. Methods 800 and 1100 are not, however, limited to being performed by the application 120 or interceptor 126 but can be performed in whole or in part by other entities of system 100. Nor are those methods limited to being performed on system 100. Methods 800 and 1100 are likewise not limited to either of the examples.

At block 802, an application 120 of client device 102a can initiate a network transaction. As noted above, executing a network transaction can result in the application 120 receiving a parent resource from a host server (e.g., 150a) that includes instructions (e.g., URLs) to fetch additional resources from other host servers (e.g., 150b, 150c). Examples of network transactions include rendering a web page, playing a media object comprising a manifest that references other media objects, and the like. The application 120 can initiate a network transaction at block 802 by, for example, requesting a web page, a media object, or the like.

As discussed above with respect to FIG. 3, an event in example 1 that triggers a request for hints at block 302 in FIG. 3 is a cursor of a browser application 120 of device 102a hovering over the displayed URL for www.example1.com. Continuing with example 1, and as illustrated in FIGS. 4C and 5, the user eventually clicks the URL www.example1.com, which, causes the application 120 to send a request for a parent resource 432 associated with www.example1.com. As illustrated in FIG. 5, the request for a parent resource 432 may occur after one or more RV-URLs from hints 414 for the parent resource have been pre-fetched. Although not shown, the request for a parent resource 432 may alternatively occur before one or more RV-URLs from hints 414 for the parent resource have been pre-fetched As also discussed above, an event in example 2 that triggers a request for hints at block 302 in FIG. 3 is the user of a browser application 120 of device 102a clicking a displayed URL www.example2.com. Continuing with example 2, and as illustrated in FIGS. 6A and 7, the user's click causes the application 120 to send a request for a parent resource 632 associated with www.example2.com to host server 150a, which in this example, may occur generally at about the same time as the request for hints 612 made as part of block 304.

At block 804, the application 120 receives the parent resource requested at block 802. As shown in FIGS. 9 and 10, in both examples 1 and 2, the application 120 receives the parent resource 434 (example 1) or parent resource 634 (example 2) of the selected URL.

At block 806, the application 120 identifies in the parent resource, among other elements, RV-URLs. In example 1, as the application 120 parses the parent resource 434 www.example1.com, the application 120 eventually finds the same RV-URL that was found as part of executing method 300, namely, host-server-150c/FILE-{variable field} and a random number generator for the variable field. In example 2, the application 120 eventually finds the same RV-URL in parent resource 634 www.example2.com.

Method 800 can perform blocks 808-818 for each RV-URL found at block 806.

At block 808, application 120 determines whether the RV-URL corresponds to resolution information locally stored in resolution information cache 122. Any such resolution information would have been sent from the server-side pre-fetch module 152 to the client-side pre-fetch module 124 at block 314 of FIG. 3.

In example 1, the application 120 finds in resolution information cache 122 resolution information 422 for RV-URL host-server-150*c*/FILE-{variable field} indicating that it was resolved at block 310 of method 300 to host-server-150*c*/FILE-1593. (See FIG. 9.) In example 2, the application 120 finds in resolution information cache 122 resolution information 622 that the RV-URL host-server-150*c*/FILE-{variable field} was resolved at block 310 of method 300 to host-server-150*c*/FILE-3117. (See FIG. 10.)

If the determination at block 808 is yes, the application 120 branches at block 810 to block 812, where the application 120 resolves the RV-URL using the cached resolution information. This can be accomplished, for example, by inserting the random number from the resolution information into the variable field of the RV-URL. The RV-URL, as resolved at block 812, should therefore be materially the same (e.g., have the same random value) as the RV-URL previously resolved at block 310 of FIG. 3 and then used to pre-fetch the RV-URL at block 316.

In example 1, the application 120 of client device 102*a* thus inserts the random number 1593 from resolution information cache 122 into the RV-URL found at block 806, which resolves to host-server-150*c*/FILE-1593. In example 2, the application 120 of the client device 102*a* inserts the random number 3117 from resolution information cache 122 into the RV-URL found at block 806, which resolves to host-server-150*c*/FILE-3117.

If the determination at block 808 is no, the application 120 branches at block 810 to block 814, where the application 120 resolves the RV-URL found at block 806 by executing the random-value function and inserting the resulting random value into the variable field of the RV-URL. This is a resolved RV-URL that has not been pre-fetched.

From block 812 or block 814, the application 120 proceeds to block 816, where the application 120 generates a request for the resolved RV-URL found at block 806. This can be accomplished generally as discussed above with respect to block 312, except that the request is not a pre-fetch but is an actual request from the application 120. At block 818, the application 120 can send the request for the resolved RV-URL to the corresponding host server 150.

In example 1, the application 120 sends the request 442 (which was generated at block 812) to host server 150*c* for a resource at FILE-1593. (See FIG. 9.) In example 2, the application 120 sends the request 642 (which was generated at block 812) to host server 150*c* for a resource at FILE-3117. (See FIG. 10.)

Turning now to method 1100 of FIG. 11, at block 1102, the interceptor 126 in client device 102*a* (or client proxy 130) intercepts the request for the resolved RV-URL sent at block 818 of FIG. 8. (For example 1, see FIG. 9, and for example 2, see FIG. 10.) At block 1104, the interceptor 126 determines whether there is a locally stored pre-fetched response in the pre-fetched cache 128 that corresponds to the intercepted request.

The interceptor 126 can match the intercepted request to a pre-fetched response in the pre-fetched cache 128 in any of a number of ways. For example, the interceptor 126 can compare all or a portion (e.g., the random value) of the resolved RV-URL of the intercepted request to a corresponding portion of the resolved RV-URLs of the pre-fetched requests in the pre-fetched cache 128.

The interceptor 126 can then determine that a matching pre-fetched resource corresponds to the intercepted request and branch at block 1106 to block 1108, where the interceptor 126 can fulfill the intercepted request with the corresponding pre-fetched resource from the pre-fetched cache 128. Because the pre-fetched resource is thus a complete response to the intercepted request, the intercepted request can be discarded at block 1112.

In example 1, the interceptor 126 intercepts, at block 1102, the request 442 to host server 150*c* for the resource at FILE-1593 and finds, at block 1104, a corresponding pre-fetched resource 430 in pre-fetched cache 128 (which, as discussed above, was sent to the client device 102*a* as part of block 318 of FIG. 3). The interceptor 126 therefore branches to block 1108, where the interceptor sends, as a response to the intercepted request, the pre-fetched resource 430 from pre-fetched cache 128 that corresponds to a request to host server 150*c* for resource at FILE-1593. The interceptor 126 then discards the intercepted request 442. (See FIG. 9.)

In example 2, the interceptor 126 intercepts, at block 1102, the request 642 to host server 150*c* for the resource at FILE-3117 and finds, at block 1104, a corresponding pre-fetched resource 630 in pre-fetched cache 128 (which, as discussed above, was sent to the client device 102*a* as part of block 318 of FIG. 3). The interceptor 126 therefore branches to block 1108, where the interceptor sends, as a response to the intercepted request 642, the pre-fetched resource 630 from pre-fetched cache 128 that corresponds to a request to host server 150*c* for resource at FILE-3117. The interceptor 126 then discards the intercepted request 642. (See FIG. 10.)

In contrast, if the interceptor 126 determines at block 1104 that no matching pre-fetched resource is locally cached, the interceptor branches to block 1110, where the interceptor 126 forwards the intercepted request to the host server 150*c* to which the request is addressed. Although not shown, the host server 150*c* will receive the request and respond with the requested resource, which will then be received from the host server 150*c* by the client device 102*a*.

In the foregoing examples and discussions, the RV-URLs are described as identifying content resources. The RV-URLs, however, can represent any network resource or service. Pre-fetched resources can thus be any type of network resource or service.

Although specific embodiments and applications have been described in this specification, these embodiments and applications are exemplary only, and many variations are possible. In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. A method of accelerating execution of a network transaction, the method comprising:

identifying, by a pre-fetch module, a random-value universal resource locator (RV-URL) expected to be fetched by a client device as part of the network transaction, the identified RV-URL comprising a variable field and a random-value function;
resolving, by the pre-fetch module, the identified RV-URL to produce a resolved pre-fetch RV-URL, wherein the variable field of the resolved pre-fetch RV-URL contains a random value generated by the random-value function;
pre-fetching, by the pre-fetch module, a resource identified by the resolved pre-fetch RV-URL from a host server identified by the resolved pre-fetch RV-URL;
providing, to the client device, resolution information comprising the generated random value; and
providing, to the client device, the pre-fetched resource.

2. The method of claim 1, wherein the resolving the identified RV-URL comprises:
executing the random-value function to generate the random value, and
inserting the generated random value into the variable field of the identified RV-URL.

3. The method of claim 2, wherein:
the random-value function comprises a random-number function, and
the random value is a random number generated by the random-number function.

4. The method of claim 1, wherein the pre-fetching the resource comprises:
generating a pre-fetch request for the resource identified by the resolved pre-fetch RV-URL, and
sending the pre-fetch request to the host server.

5. The method of claim 4, wherein the pre-fetching the resource further comprise receiving, in response to the pre-fetch request, a response from the host server comprising the pre-fetched resource.

6. The method of claim 1, wherein the provided resolution information further comprises the resolved pre-fetch RV-URL.

7. The method of claim 1, wherein the pre-fetching comprises transmitting a pre-fetch request to the host server, and wherein the provided resolution information further comprises the pre-fetch request.

8. The method of claim 1, further comprising:
receiving, at the pre-fetch module, hints for executing the network transaction,
wherein the identifying the RV-URL comprises encountering the RV-URL in the received hints.

9. The method of claim 8, wherein:
the received hints comprise information from a prior execution of the network transaction, and
the identified RV-URL was used in the prior execution of the network transaction to fetch a resource.

10. The method of claim 8, further comprising forwarding the received hints to the client device.

11. The method of claim 10 further comprising, prior to forwarding the received hints to the client device, adding, by the pre-fetch module, to the received hints the random value contained in the variable field of the resolved pre-fetch RV-URL.

12. The method of claim 1, wherein providing the resolution information and the pre-fetched resource to the client device comprises sending, by the pre-fetch module, the resolution information and the pre-fetched resource over a communications link to the client device.

13. The method of claim 12, wherein the communications link comprises a satellite link.

14. The method of claim 1, further comprising:
caching the provided resolution information on a client-side of a communications link; and
caching the pre-fetched resource on the client-side of the communications link.

15. The method claim 14 wherein:
the caching the provided resolution information on the client-side of the communications link comprises caching the provided resolution information at the client device; and
the caching the pre-fetched resource on the client-side of the communications link comprises caching the pre-fetched resource at a client proxy associated with the client device.

16. An apparatus, disposed on a server-side of a communications network, for accelerating execution of a network transaction by a client device disposed on a client-side of the communications network, the apparatus comprising:
processor circuitry; and
digital storage having stored therein non-transient instructions that cause the processor circuitry to:
identify a random-value universal resource locator (RV-URL) expected to be fetched by the client device as part of the network transaction, the identified RV-URL comprising a variable field and a random-value function;
resolve the identified RV-URL to produce a resolved pre-fetch RV-URL, wherein the variable field of the resolved pre-fetch RV-URL contains a random value generated by the random-value function;
pre-fetch a resource identified by the resolved pre-fetch RV-URL from a host server identified by the resolved pre-fetch RV-URL;
provide, to the client device, resolution information comprising the generated random value; and
provide, to the client device, the pre-fetched resource.

17. The apparatus of claim 16, wherein the digital storage further having stored therein non-transient instructions that cause the processor circuitry to:
execute the random-value function to generate the random value, and
insert the generated random value into the variable field of the identified RV-URL.

18. The apparatus of claim 17, wherein:
the random-value function comprises a random-number function, and
the generated random value is a random number generated by the random-number function.

19. The apparatus of claim 16, wherein the digital storage further having stored therein non-transient instructions that cause the processor circuitry to:
generate a pre-fetch request for the resource identified by the resolved pre-fetch RV-URL, and
send the pre-fetch request to the host server.

20. The apparatus of claim 19, wherein the digital storage further having stored therein non-transient instructions that cause the processor circuitry to receive, in response to the pre-fetch request, a response from the host server comprising the pre-fetched resource.

21. The apparatus of claim 16, wherein the provided resolution information further comprises the resolved pre-fetch RV-URL.

22. The apparatus of claim 16, wherein the digital storage further having stored therein non-transient instructions that cause the processor circuitry to generate a pre-fetch request to the host server, and wherein the provided resolution information further comprises the pre-fetch request.

23. The apparatus of claim 16, wherein the digital storage further having stored therein non-transient instructions that cause the processor circuitry to:
  receive hints for executing the network transaction,
  identify the RV-URL in the received hints, and wherein identification of the RV-URL is based on identification of the RV-URL in the received hints.

24. The apparatus of claim 23, wherein:
  the received hints comprise information from a prior execution of the network transaction, and
  the identified RV-URL was used in the prior execution of the network transaction to fetch a resource.

25. The apparatus of claim 23, wherein the digital storage further having stored therein non-transient instructions that cause the processor circuitry to forward the received hints to the client device.

26. The apparatus of claim 25, wherein the digital storage further having stored therein non-transient instructions that cause the processor circuitry to, prior to forwarding the received hints to the client device, add to the received hints the random value contained in the variable field of the resolved pre-fetch RV-URL.

27. The apparatus of claim 16, wherein the digital storage further having stored therein non-transient instructions that cause the processor circuitry to send the resolution information and the pre-fetched resource over a communications link to the client device.

28. The apparatus of claim 27, wherein the communications link comprises a satellite link.

* * * * *